May 6, 1969
W. G. BROWN ET AL
3,443,246
MULTIVIBRATOR ENABLING CIRCUIT
Filed Oct. 2, 1967
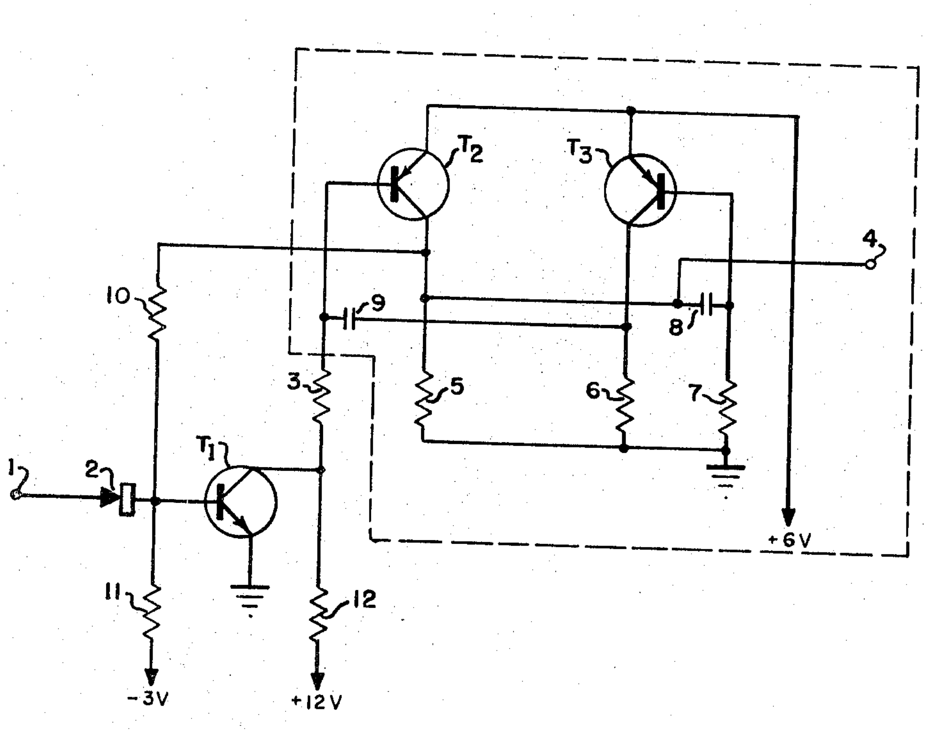
INVENTORS
WARREN G. BROWN
ROY E. LOTT, JR.
BY Harry M. Saragovitz
Edward J. Kelly, Herbert Berl
& Anthony T. Lane
ATTORNEYS.

United States Patent Office 3,443,246
Patented May 6, 1969

3,443,246
MULTIVIBRATOR ENABLING CIRCUIT

Warren G. Brown, River Vale, and Roy E. Lott, Jr., Glen Rock, N.J., assignors, by mesne assignments, to the United States of America as represented by the Secretary of the Army Filed Oct. 2, 1967, Ser. No. 672,385
Int. Cl. H03k 3/28, 3/31
U.S. Cl. 331—113 3 Claims

ABSTRACT OF THE DISCLOSURE

A multivibrator enabling circuit designed to control the number of output pulses from the multivibrator in response to an enabling voltage. The enabling circuit also provides means for maintaining the output pulse width as a function of the multivibrator alone, and not as a function of the time of removal of the enabling voltage. The multivibrator is a transistorized free running type multivibrator. It is enabled by means of a transistor switch that is closed in response to an input signal. In the absence of an input signal the switch is open and the multivibrator is cut-off. The output from the multivibrator is fed back to the input of the transistor switch through an OR gate to hold the switch closed for approximately an additional half cycle after the input signal to the switch is removed. Without this feedback the last pulse in the output pulse train of the multivibrator would always be shorter in width than the other pulses.

*Background of the invention*

This invention relates to pulse generating circuits and more particularly to an enabling circuit for a transistorized free running type multivibrator.

The pulse trains utilized in some digital communication systems must have uniform pulse widths for satisfactory operation of the system. When free running multivibrators are used, the last pulse of a given pulse train is always shorter than the other pulses unless some additional means are provided to insure uniform pulse widths. Similarly, controlling the exact number of output pulses is essential in some digital communication applications. There are several ways to control the number of pulses in a given pulse train from a multivibrator, some very complex. The present invention provides a simple switch to turn the multivibrator "on" and "off" and provides means to insure uniform pulse widths for the entire pulse train.

*Summary of the invention*

It is therefore, and object of this invention to provide a multivibrator enabling circuit.

Another object of this invention is to provide a pulse generator capable of producing pulse trains of uniform pulse widths.

A further object of this invention is to provide a simple transistor switch for a multivibrator.

*Brief description of the drawing*

The above mentioned and other objects of the invention will be readily apparent from the following detailed description when read in conjunction with the annexed drawing in which the single figure shows a preferred embodiment of the invention.

*Description of the preferred embodiment*

Referring now to the drawing, the circuit within the dotted box is a conventitonal free running multivibrator. The multivibrator comprises two transistors $T_2$ and $T_3$ and the associated interconnecting circuitry. The output from the multivibrator is taken at the terminal 4. The transistor $T_1$ is used to turn the multivibrator "on" and "off."

In the quiescent state transistor $T_1$ is cut-off by the negative bias applied to its base and transistor $T_2$ is biased off by the +12 v. DC through the resistors 3 and 12. The voltage at the base of transistor $T_3$ is slightly less than +6 volts. When an input signal is applied to the base of transistor $T_1$ through the diode 2, transistor $T_1$ loses its negative bias and begins to conduct. When transistor $T_1$ conducts, transistor $T_2$ starts conducting and the charge on capacitor 8 (+6 volts) turns transistor $T_3$ off. Capacitor 8 then discharges and starts to charge with reverse polarity through transistor $T_2$ and the resistor 7. At the same time the capacitor 9 charges through the emitter-base junction of transistor $T_2$ and the resistor 6. When capacitor 8 starts to reverse polarity, transistor $T_3$ loses its reverse bias and conducts causing transistor $T_2$ to turn off due to the charge on capacitor 9. The multivibrator continues to oscillate with transistors $T_2$ and $T_3$ alternately turning on and off as long as transistor $T_1$ continues to conduct. The output from the collector of transistor $T_2$ is fed back to the base of transistor $T_1$ through the resistor 10. Diode 2 and resistor 10 form an OR gate.

Assume for the moment that the feedback circuit just described is not part of the circuit. Without the feedback transistor $T_1$ will cut-off as soon as the input signal is removed from input terminal 1. When transistor $T_1$ cuts off, the multivibrator will stop running because the ground return to the base of transistor $T_2$ is disconnected. Due to circuit time delays, the multivibrator does not stop immedately when transistor $T_1$ cuts off. These circuit time delays cause the multivibrator to operate for $\frac{1}{10}$ to $\frac{1}{4}$ of a cycle after the input signal is removed from the base of transistor $T_1$. Therefore, the last pulse in the train will always be shorter in width than the other pulses. In some applications this condition can not be tolerated because pulses of uniform width are essential for proper operation of the circuits that follow the multivibrator.

Our circuit provides uniform pulse widths throughout a given pulse train. All the pulses in the train, including the last, are the same width. The multivibrator determines the pulse width and not the time of applying the enabling voltage to the base of transistor $T_1$. This is accomplished by the feedback circuit from the collector of transistor $T_2$ to the base of transistor $T_1$. When the input signal is removed from the base of transistor $T_1$ the feedback from transistor $T_2$ holds transistor $T_1$ conducting as long as transistor $T_2$ is conducting. When transistor $T_2$ ceases to conduct for that cycle, transistor $T_1$ is cut off and the multivibrator stops running. Therefore, the last pulse is always a full width pulse.

From the foregoing description it is obvious that the invention provides a simple, efficient and positive method for controlling a free running multivibrator. In addition, all the pulses in a given pulse train are of uniform width and the number of pulses in a given pulse train is readily controlled.

The invention was described with reference to a preferred embodiment. It will be obvious to those skilled in the art that various changes and modifications may be made to the preferred embodiment without departing from the scope of invention as set forth in the claims.

We claim:

1. A multivibrator enabling circuit comprising:
a free running multivibrator having a first transistor and a second transistor;
a third transistor having an input and an output;
diode means to apply an enabling voltage to said input of said third transistor;

means to connect said output of said third transistor to said multivibrator;

and resistor means to feed back a signal from said multivibrator to said input of said third transistor, said resistor and diode in combination being an OR gate.

2. A multivibrator enabling circuit as described in claim 1 wherein said first, second and third transistors each have a base, a collector and an emitter.

3. A multivibrator enabling circuit as described in claim 2 wherein said diode is connected to the base of said third transistor;

said resistor is connected between the base of said third transistor and the collector of said first transistor;

and said means to connect the output of said third transistor to said multivibrator is a second resistor connected between the collector of said third transistor and the base of said first transistor.

References Cited

UNITED STATES PATENTS

| | | | |
|---|---|---|---|
| 3,133,257 | 5/1964 | Palmer et al. | 331—113 |
| 3,140,446 | 7/1964 | Myers et al. | 328—194 X |

ROY LAKE, *Primary Examiner.*

S. H. GRIMM, *Assistant Examiner.*

U.S. Cl. X.R.

307—247, 291; 331—145, 173